INVENTOR.
Ralph WIKEN

2,873,615

DIVIDED POWER TRANSMISSIONS

Ralph Wiken, Bayside, Wis., assignor to The Falk Corporation, Milwaukee, Wis., a corporation of Wisconsin Application August 7, 1957, Serial No. 676,757

4 Claims. (Cl. 74—410)

The invention relates to divided power transmissions.

Divided power transmissions are useful for driving mechanisms or machines where the use of a single power drive due to initial cost, space requirements or high power requirements would be uneconomical or impossible.

The main object of the present invention is to provide a simple divided power drive transmission embodying hypoid gear reduction connections for the separate shafts in which the drive shaft is mounted to float axially to equalize the torques transmitted to these shafts.

A further object of the invention is to provide a structure in which the gearing connections between the drive shaft and the separate shafts may all be compactly mounted in a single housing thereby simplifying and reducing the cost of manufacture and insuring accuracy of alignment of the parts.

The invention further consists in the several features hereinafter set forth and more particularly defined by claims at the conclusion hereof.

Figure 1:
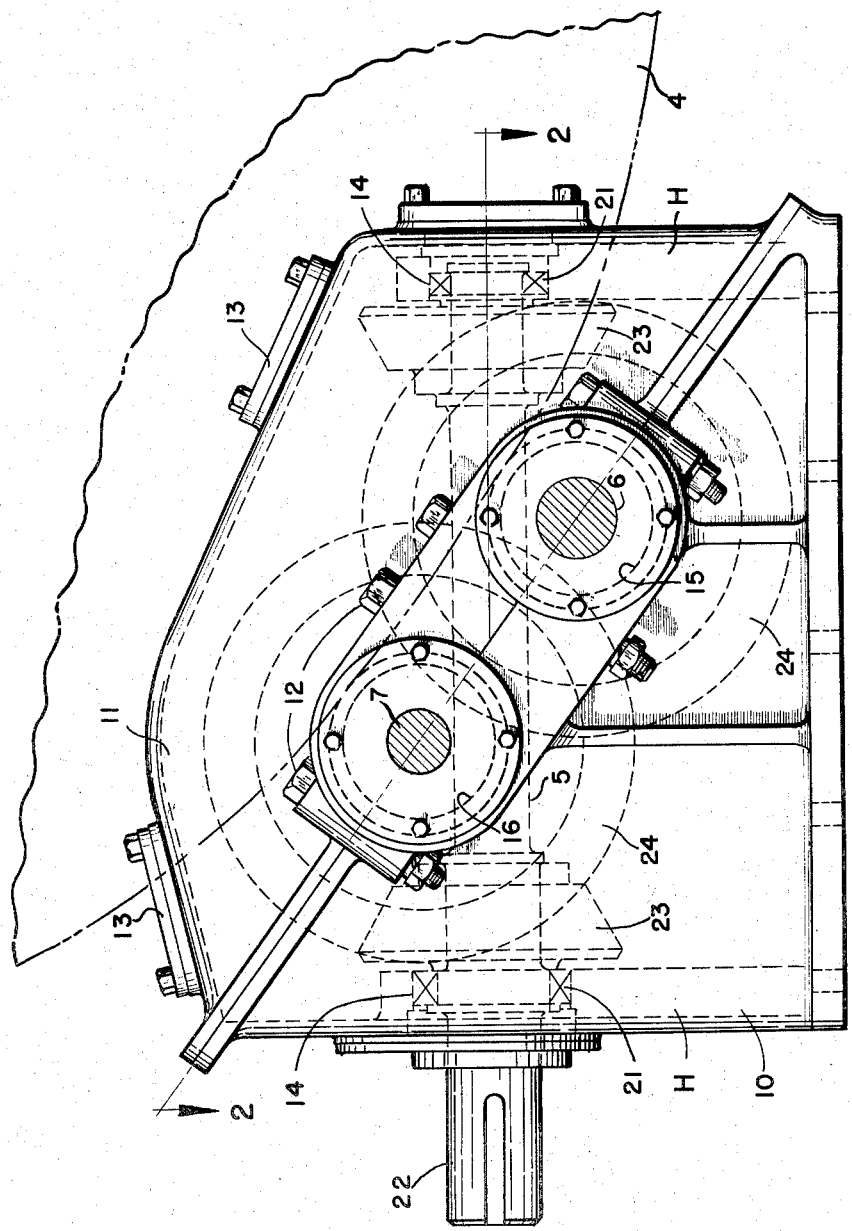
Fig. 1 is a side elevation of a power transmission embodying the invention.

The invention has been shown as driving a large ring gear 4 that forms a part of the mechanism or machine to be driven, such ring gears for example being used on machines such as kiln driers, ball mills and roll mills requiring large amounts of driving power.

Referring to the drawings, the transmission includes a housing H, a drive shaft 5, driven shafts 6 and 7 mounted in parallel relation to each other and at right angles to said drive shaft, driven gears 8 and 9 meshing with the ring gear 4 and operatively connected respectively to the shafts 6 and 7 by self-aligning couplings C of the type shown and described in U. S. Patent No. 2,027,842, dated January 14, 1936, to W. P. Schmitter and P. C. Day.

The housing H is a sectional casing comprising a base section 10 and a top section 11 joined together by bolts 12 at an angle of forty-five degrees there being access openings in section 11 normally closed by removably bolted sealed covers 13.

Figure 2:
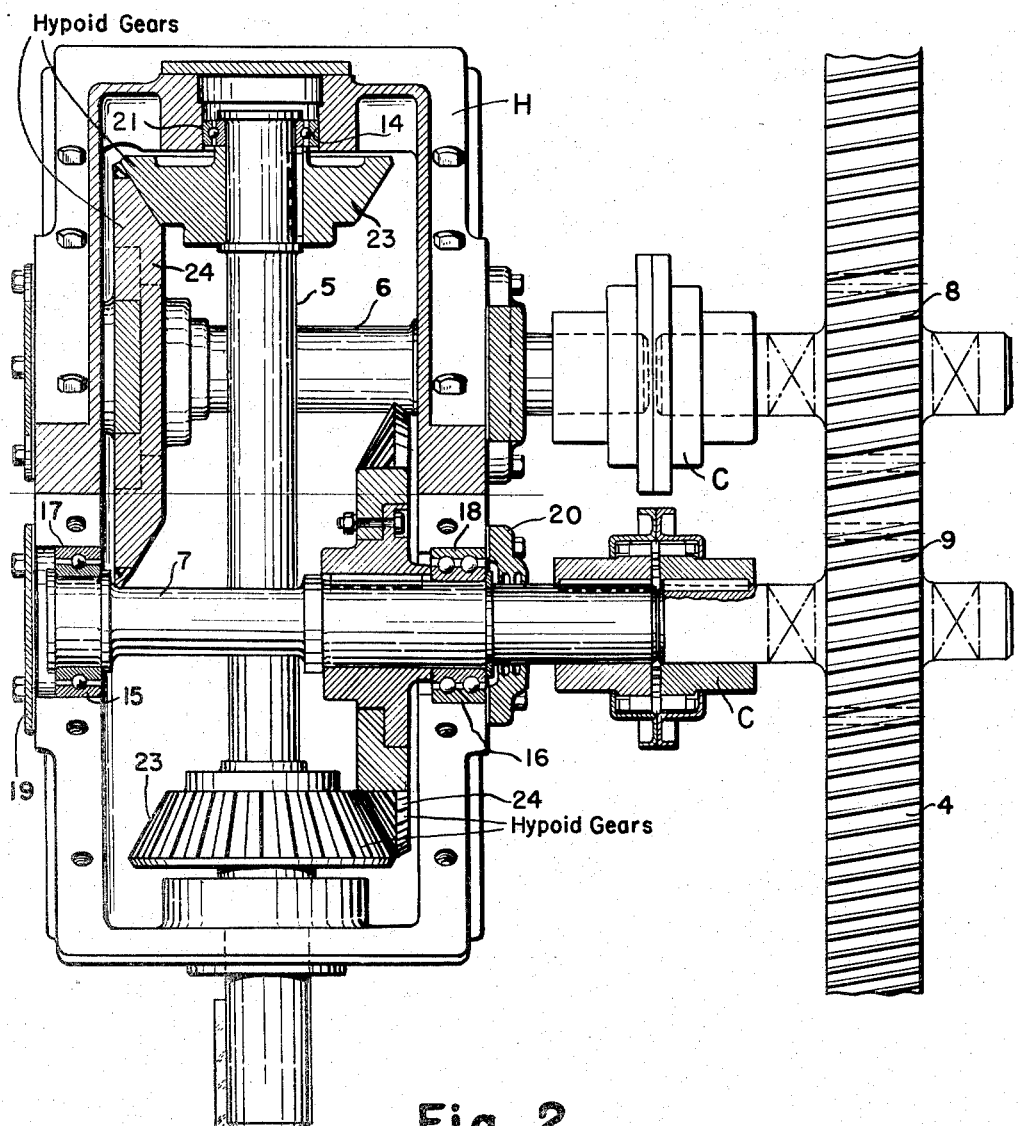
Fig. 2 is a detailed horizontal sectional view taken on the line 2—2 of Fig. 1.

The housing at each end is provided with a bore 14, one bore being formed in base section 10 and the other in top section 11, said bores being axially aligned and extending parallel to the base of the housing. At spaced distances above its base and on the line of joinder of the housing sections the opposite sides of the housing are provided with sets of aligned bores 15 and 16 in which bearings 17 and 18 for a driven shaft are respectively mounted, as shown in detail in Fig. 2 in connection with the shaft 7 which is mounted in said bearings, the other shaft 6 being similarly mounted. Since the bores 15 and 16 are through bores, a cover 19 is removably secured to housing adjacent the bore 15 and an annular sealing type cover ring 20 is removably secured adjacent the bore 16.

The drive shaft 5 which may be suitably connected by a coupling or other suitable connection with a source of power, such as an electric motor (not shown) carries spaced bearings 21 whose outer races are free to slide in the bores 14, the shaft having a power applicator extension 22. Thus the shaft 5 is journaled in the housing but free to move or float axially relative thereto.

Hypoid gearing connections are provided between the shaft 5 and each of the driven shafts 6 and 7 each comprising a drive gear 23 mounted on the shaft 5 and a driven gear 24 fixedly mounted on the associated driven shaft 6 or 7. The drive gears 23 are arranged in spaced relation along and fixed to the shaft 5 in positions for proper meshing relation with their companion gears, it being noted that the contacts between the gears of one set are on the opposite side of the shaft from those of the other set and that the gears 23 are oppositely disposed so that the shafts 6 and 7 are rotated in the same direction to supply the driving power to the gears 8 and 9. Also because of this disposition of these hypoid gear sets the thrusts imparted to the shaft 5 by one set of these gears is in the opposite direction to those imparted to the shaft by the other set of gears and since the shaft 5 is free to float axially these thrusts are counterbalanced or equalized so that equal power increments are delivered from the shaft 5 to the shafts 6 and 7 in the rotation of said shaft 5.

The housing H when closed forms an oil tight case, the bearing through which the extended end of shaft 5 projects being suitably sealed, oil or other suitable lubricant being introduced through the upper of the covered openings previously referred to.

I desire it to be understood that this invention is not to be limited to any particular form or arrangement of parts except insofar as such limitations are included in the appended claims.

I claim:

1. In a power transmission, the combination of a housing having spaced aligned bores, a drive shaft journaled in said housing and free to float axially in said bores and having a power applicator end projecting from said housing, a pair of driven shafts journaled in said housing in parallel relation with each other and disposed at an angle to said drive shaft, and intermeshing hypoid gears on said drive shaft and said driven shafts to drivingly connect said drive shaft with said driven shafts and so arranged that the thrusts interposed by said gears are transmitted to said drive shaft in opposite directions.

2. Power transmission as defined in claim 1 wherein the housing is formed of two sections having a line of division extending at an angle to the base of the housing, and intersecting bores for receiving the bearings for said driven shafts.

3. Power transmission as defined in claim 1 wherein the line of division between the sections extends at an angle of forty-five degrees relative to the base of the housing.

4. In a power transmission, the combination of a drive shaft, a pair of spaced driven shafts disposed parallel to each other and at an angle to said drive shaft, sets of intermeshing hypoid gears connecting said drive shaft with said driven shafts, supporting means for said shafts including a floating mounting for said drive shaft, one of said sets of hypoid gearing being oppositely disposed relative to those of the other set so that forces set up in these gear sets and transmitted to said drive shaft are counterbalanced, a large gear on the mechanism to be driven, and smaller gears of equal diameter on said spaced driven shafts meshing with the teeth of said large gear.

References Cited in the file of this patent

UNITED STATES PATENTS

| | | |
|---|---|---|
| 495,009 | Bitner | Apr. 11, 1893 |
| 798,907 | Knudsen | Sept. 5, 1905 |
| 1,810,747 | Benson | June 16, 1931 |
| 2,027,013 | Barnes | Jan. 7, 1936 |
| 2,396,781 | Glunn | Mar. 19, 1946 |
| 2,548,182 | Wagner | Apr. 10, 1951 |
| 2,600,912 | Olson | June 17, 1952 |
| 2,687,045 | Schroeder | Aug. 24, 1954 |
| 2,780,942 | Babcock | Feb. 12, 1957 |